United States Patent [19]
Stanley et al.

[11] 3,891,423
[45] June 24, 1975

[54] SUBSTRATE HAVING A SLIGHTLY WATER SOLUBLE BINDER AND A HERBICIDE FOR RETARDING WEED GROWTH OVER A LONG PERIOD OF TIME

[75] Inventors: Leonard A. Stanley; Loyd G. Kasbo, both of Charlotte, N.C.

[73] Assignee: The Kendall Co., Walpole, Mass.

[22] Filed: Feb. 25, 1974

[21] Appl. No.: 445,432

Related U.S. Application Data
[63] Continuation of Ser. No. 222,542, Feb. 1, 1972, abandoned.

[52] U.S. Cl. ...................... 71/86; 71/79; 71/DIG. 1
[51] Int. Cl. .............................................. A01n 9/36
[58] Field of Search ............. 71/79, DIG. 1, 77, 87, 71/93, 121, 103, 120, 86; 47/9

[56] References Cited
UNITED STATES PATENTS
| | | | |
|---|---|---|---|
| 2,571,491 | 10/1951 | Schindler | 47/32 X |
| 2,949,698 | 8/1960 | Downey et al. | 47/32 X |
| 2,951,753 | 9/1960 | Groves | 71/DIG. 1 |
| 3,096,167 | 7/1963 | Farmer | 71/93 |
| 3,299,566 | 1/1967 | MacMullen | 71/DIG. 1 |
| 3,704,544 | 12/1972 | Spanel et al. | 47/9 |

Primary Examiner—James O. Thomas, Jr.

[57] ABSTRACT

A weed growth retardant comprising a sheetlike water-permeable substrate, and a very slightly water soluble film forming binder adherent to the substrate and containing a pre-emergence herbicidal agent. Other materials such as fertilizers, pesticides and fungicides may also be present in the substrate.

1 Claim, 2 Drawing Figures

PATENTED JUN 24 1975  3,891,423

SUBSTRATE HAVING A SLIGHTLY WATER SOLUBLE BINDER AND A HERBICIDE FOR RETARDING WEED GROWTH OVER A LONG PERIOD OF TIME

This is a continuation of application Ser. No. 222,542, filed Feb. 1, 1972, now abandoned.

This invention relates to herbicide treatment of plants for retarding undesired weed growth.

The outside growing of plants in containers, including in particular such woody plants as azaleas, rhododendrons and the like is carried out on an extremely large scale. They are relatively slow growing plants, taking at least from 9 to 18 months to become saleable, during which time they must be cared for. In this regard, since such woody plants do not have thick foliage, weed growth presents a real problem that must be dealt with in some manner. Of course, hand labor is a possible solution, but it is too expensive to be practical. Nor have the well known herbicides proved to provide a satisfactory solution to the problem. This is not only because of the difficulty of applying them to each container in the necessary relatively minute but accurate quantity, but also because of the necessity for doing so several times during their relatively long growth period. In the latter regard, hand labor is prohibitive expense. It also causes misuse of herbicide due to spillage, overtreatment, blowing of herbicide dust to other areas and other accidents which lead to the destruction of desired plants.

Accordingly, it is a major object of the present invention to provide a practical solution to the above and other problems.

This is accomplished by providing a weed growth retardant in the form of a sheetlike, water permeable substrate, for example, of fabric, having thereon a very slightly soluble film forming binder adherent to said substrate and containing a herbicidal agent, preferably of the pre-emergence type.

In use, with the substrate lying on top of the soil in the plant container, rainfall or other irrigation percolating through it will release the herbicide at the desired slow rate to prevent weed growth from occurring over the several months of plant development, all without the employment of manual labor and without danger of plant damage.

The crux of the present invention lies in the very slightly soluble, herbicide containing, film forming binder adherent to the substrate and its role in controlling the release of the herbicide therein at the desired predetermined slow rate during irrigation, by natural rainfall or otherwise. In fact, the binder is so slightly soluble as to fall within the definition of an insoluble material for many purposes, but, since its function in the present invention is to provide a predetermined slow release of herbicide, it will be characterized herein as very slightly soluble to conform with such function. Similarly, slow release fungicides, pesticides, fertilizers and the like may also be incorporated in the substrate.

For the purpose of more fully explaining further objects and features of the invention, reference is now made to the following detailed description of preferred embodiments thereof, taken together with the accompanying drawings wherein.

Figure 1:
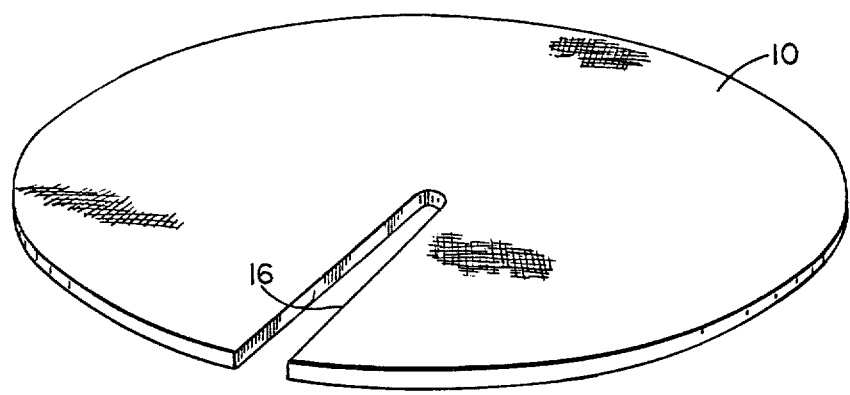
FIG. 1 is a plan view of a fabric substrate according to the invention.
Figure 2:
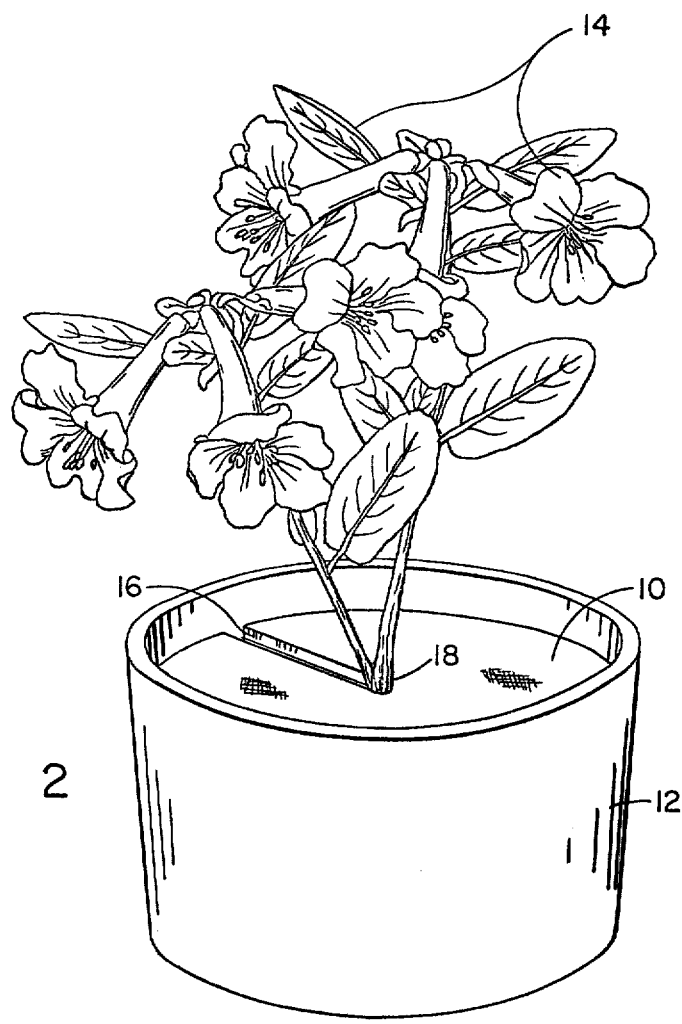
FIG. 2 is a perspective view of the substrate of FIG. 1 in use for retarding the weed growth of a woody plant.

Referring to the drawings, the fabric substrate 10 is in generally circular disk form to fit within a conventional plant container 12 in which is planted a woody plant, 14, herein illustrated as a rhododendron. A radial slit 16 may be provided in disk 10 to facilitate positioning it on the surface of the soil in container 12 about the stem 18 of plant 14.

The substrate may be of any of a wide variety of sheetlike materials, water permeable for the passage of natural or artificial rain or other irrigation therethrough. Among such materials are woven and knitted fabrics, non-wovens, and even perforated materials. These materials can be made up of natural fibers, for example, cotton or synthetic fibers, such as rayon, nylon, polyethylene or polypropylene, cost being a primary consideration. The use of cotton requires a rot resistance slow release fungicide treatment, as described in our earlier application, Ser. No. 36,037, filed May 11, 1970. Other materials such as slow release systemic pesticides and fertilizers may also be included.

The herbicide and binder may be applied to the substrate, before cutting it into disks 10 or other form, in any convenient manner. For example, it may be applied as a conventional fabric finishing operation, or it may be applied to the warp yarns only during the warp sizing operation, as disclosed in copending applications Ser. Nos. 36,037 and 36,038, both filed May 11, 1970, both now abandoned in favor of Ser. No. 442,603, filed Feb. 14, 1972. If cotton or other cellulosic material be employed, a rot resistant agent may be applied at the same time. Fertilizers may also be added.

A variety of satisfactory very slightly soluble film forming binders are available in the commercial art for combining with herbicides to perform the predetermined slow release thereof in accordance with the invention. Among them are: modified starch, modified polyvinyl alcohol and modified carboxymethyl cellulose, emulsions of polyvinyl acetate and polyacrylates and dispersions of polyvinyl butyrals, as well as a variety of other materials known to the art such as condensation polymers including polyethers, polyesters, polyamides and polyurethanes. Specific binders used in the Examples which follow are:

RHOPLEX HA-8, a polyacrylic acid ester binder manufactured by Rohm and Haas Company;

DUR-O-SET SBX, a polyvinyl acetate (PVAC) binder manufactured by Chas. S. Tanner Company.

The pre-emergence herbicidal agents which may be used in the invention encompass a wide range, which, as is known to those skilled in the art, must be selected both as to agent and dosage with regard to the particular requirements of the plant to be protected. In general, the herbicide may be selected from the group consisting of carbamates, thiocarbamates, urea derivatives, triazine derivatives, benzoic acid derivatives, dinitro substituted derivatives, and mixtures thereof, as well as other materials.

Specific herbicides which are useful in products of the invention are:

BETASAN, the trademark of Stauffer Chemical Company for S-(O, O-diisopropyl phosphorodithioate) of N-(2 mercaptoethyl) benzenesulfonamide.

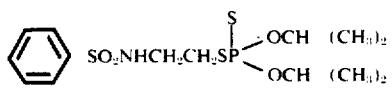

AVADEX, the trademark of Monsanto for 2,3-dichloroallyl N,N-diisopropylthiolcarbamate

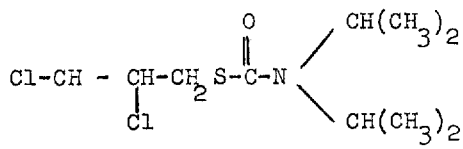

PHOSFON, the trademark of Virginia-Carolina for tributyl, 2,4-dichlorobenzylphosphonium chloride

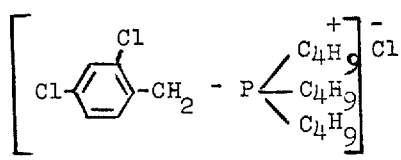

LINURON, the trademark of DuPont for 3-(3,4-dichlorophenyl)1-methoxy-1-methylurea

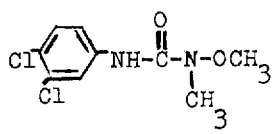

ATRAZINE, the trademark of Geigy for 2-chloro-4-ethylamino-6-isopropylamino-1,3,5-triazine

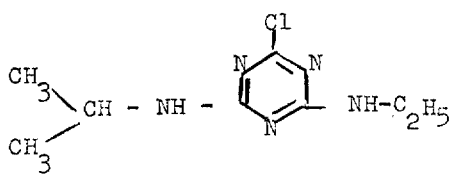

SOLAN, the trademark of FMC for N-(3-chloro-4-methylphenyl)-2-methylpentanamide

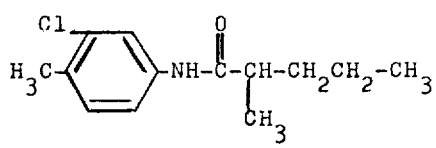

AMIBEN, the trademark of Amchem for 3-amino-2,5-dichlorobenzoic acid

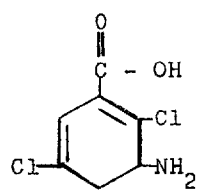

DNBP, the trademark of Dow for 4,6-dinitro-o-secbutylphenol alkanolamine salts

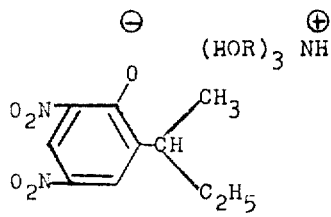

R = ethyl and/or isopropyl

TUPERSAN, the trademark of DuPont for 1-(2-methylcyclohexyl)-3-phenyl urea

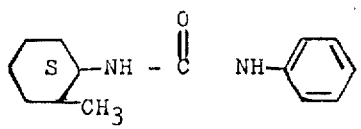

HERBAN, the trademark of Hercules for 3-(hexahydro-4,7-methanoindan-5-yl)-1,1-dimethylurea

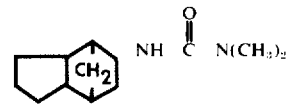

PLANAVIN, the trademark of Shell for 4-(methylsuflonyl)-2,6-dinitro-N,N-dipropylaniline

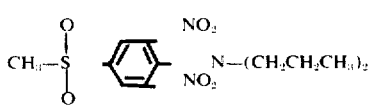

TREFLAN, the trademark of Elanco Products for α,α,α-trifluoro-2,6-dinitro-N,N-dipropyl-p-toluidine

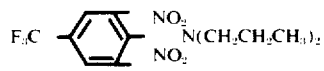

In each of the Examples 1 through 12 tabulated, the fabric used was padded with a herbicide-binder mixture as shown in the following Table I and then dried. Table II shows the actual pickup.

The fabric was then watered regularly to simulate rainfall, so that the amount of herbicide extracted at each rainfall could be measured as shown in Table III, as follows:

A specially constructed stand was placed inside a 4000 ml beaker. A circle of fabric 4.5 inches in diameter, treated with herbicide and a binder according to the invention, was placed on a screen shelf on the stand. A funnel with a spray head was suspended directly above the fabric sample, with the bottom of the sprayer 7 inches from the top of the beaker. Three hundred ml of distilled water was poured all at once into the funnel and allowed to spray the sample. This represented 0.75 inches of rainfall through the sample.

The water was then placed in a preweighed beaker and evaporated to dryness, leaving a residue. The beaker and residue were dried and weighed. The amount of residue was then determined.

In the tabulated Examples 1 through 12, the three fabrics identified as fabrics A, B and C, are as follows:
Fabric A: 60 × 48 5.32 cotton print cloth in the grey.
Fabric B: 34 × 24 polypropylene scrim made up of 280 denier yarn.
Fabric C: WEBRIL, tradename of The Kendall Company for a non-woven (E 3563) blend of nylon and cellulosic (rayon) fiber of 1.37 oz./sq. yd.

TABLE I

| | PER CENT COMPOSITION OF PAD BATH | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Treflan Herbicide (Elanco Prod. Co.) | 1.0 | 3.0 | 5.0 | 7.0 | 3.0 | 7.0 | | | | | | |
| Betasan 4-E Herbicide (Stauffer Chem.) | | | | | | | 5.0 | 7.0 | 10.0 | 15.0 | 7.0 | 15.0 |
| Rhoplex HA-8 (46% Solids) | 21.8[1] | 21.8 | 21.8 | 21.8 | | | 21.8 | 21.8 | 21.8 | 21.8 | | |
| Oxalic Acid | 0.1 | 0.1 | 0.1 | 0.1 | | | 0.1 | 0.1 | 0.1 | 0.1 | | |
| Duroset SBX (55% Solids - PVAc) | | | | | 18.2[1] | 18.2 | | | | | 18.2 | 18.2 |

[1]Ten per cent solids on fabric for Rhoplex and PVAc based on 100% wet pick-up for the cotton fabric.

TABLE II

| Sample No. | Fabric | HERBICIDE-BINDER ADD-ONS | | |
|---|---|---|---|---|
| | | % Wet Pick-Up | Solids Gms Add-On | Solids % Add-On |
| 1 | A | 80.0 | 1.6 | 7.62 |
| | B | 65.1 | 1.0 | 3.97 |
| | C | 70.6 | 0.6 | 3.92 |
| 2 | A | 77.5 | 1.6 | 7.21 |
| | B | 65.1 | 1.4 | 5.81 |
| | C | 64.2 | 0.4 | 2.42 |
| 3 | A | 76.4 | 1.8 | 7.86 |
| | B | 57.3 | 1.1 | 4.44 |
| | C | 58.2 | 0.4 | 2.42 |
| 4 | A | 68.4 | 1.7 | 7.56 |
| | B | 53.1 | 1.3 | 5.12 |
| | C | 55.4 | 0.4 | 2.70 |
| 5 | A | 72.7 | 1.5 | 6.82 |
| | B | 60.8 | 1.2 | 4.32 |
| | C | 66.9 | 0.5 | 3.07 |
| 6 | A | 72.9 | 1.5 | 6.79 |
| | B | 56.1 | 1.6 | 5.76 |
| | C | 63.8 | 0.4 | 2.68 |
| 7 | A | 85.1 | 2.8 | 11.3 |
| | B | 49.5 | 1.5 | 5.34 |
| | C | 67.5 | 0.5 | 3.31 |
| 8 | A | 82.7 | 3.0 | 12.7 |
| | B | 46.0 | 1.6 | 5.84 |
| | C | 65.1 | 0.8 | 5.26 |
| 9 | A | 85.3 | 3.7 | 15.1 |
| | B | 47.7 | 1.8 | 6.45 |
| | C | 63.4 | 0.8 | 5.23 |
| 10 | A | 86.0 | 3.8 | 15.2 |
| | B | 47.7 | 2.0 | 7.02 |
| | C | 66.4 | 1.1 | 7.24 |
| 11 | A | 82.3 | 2.2 | 9.05 |
| | B | 47.8 | 1.3 | 4.71 |
| | C | 64.1 | 0.5 | 2.94 |
| 12 | A | 84.0 | 3.0 | 12.3 |
| | B | 44.6 | 1.6 | 5.76 |
| | C | 75.8 | 0.7 | 4.58 |

TABLE III

AMOUNT OF HERBICIDE (MG.) LEACHED OUT UPON DAILY WATERING WITH THREE QUARTERS INCH OF SIMULATED RAINFALL

| Sample No. | Fab. | Herbicide and % Concentration | Binder | Day Number | | | | | | |
|---|---|---|---|---|---|---|---|---|---|---|
| | | | | 1 | 2 | 3 | 4 | 5 | 17 | 30 |
| 1 | A | 1.0 Treflan (T) | Rhoplex HA-8 | 5.8 mg | 2.6 mg | 5.1 mg | 7.0 mg | 1.8 mg | | |
| | B | 1.0 | | 0.7 | 5.7 | 0.5 | 1.9 | 0.9 | | |
| | C | 1.0 | | 2.3 | 0.7 | 3.1 | 4.7 | 3.4 | | |
| 2 | A | 3.0 Treflan (T) | Rhoplex HA-8 | 6.9 | 1.9 | 4.0 | 7.3 | 0.7 | 3.1 | 0.7 |
| | B | 3.0 | | 0.6 | 6.5 | 1.1 | 1.9 | 0.5 | | |
| | C | 3.0 | | 2.7 | 1.8 | 3.5 | 3.4 | 2.2 | | |
| 3 | A | 5.0 Treflan (T) | Rhoplex HA-8 | 6.1 | 1.2 | 4.4 | 5.7 | 0.3 | | |
| | B | 5.0 | | 1.4 | 5.0 | 1.3 | 1.4 | 1.9 | | |
| | C | 5.0 | | 2.8 | 1.6 | 3.0 | 4.2 | 2.0 | | |
| 4 | A | 7.0 Treflan (T) | Rhoplex HA-8 | 3.9 | 1.6 | 4.6 | 5.7 | 1.1 | | |
| | B | 7.0 | | 2.8 | 5.2 | 2.0 | 2.4 | 1.7 | | |
| | C | 7.0 | | 2.6 | 1.5 | 2.3 | 3.6 | 2.0 | | |
| 5 | A | 3.0 Treflan (T) | PVAc | 5.4 | 0.8 | 3.1 | 5.1 | 0.2 | | |
| | B | 3.0 | | 5.0 | 4.7 | 1.0 | 3.8 | 1.6 | | |
| | C | 3.0 | | 2.2 | 2.7 | 2.3 | 3.0 | 2.2 | | |
| 6 | A | 7.0 Treflan (T) | PVAc | 6.1 | 1.0 | 4.1 | 6.1 | 1.5 | | |
| | B | 7.0 | | 5.8 | 6.1 | 0.8 | 2.4 | 0.9 | | |
| | C | 7.0 | | 3.0 | 1.9 | 3.3 | 3.4 | 2.5 | | |
| 7 | A | 5.0 Betasan (B) | Rhoplex HA-8 | 7.9 | 8.6 | 4.1 | 4.8 | 0.4 | 3.3 | 1.4 |
| | B | 5.0 | | 4.9 | 5.5 | —[1] | 4.5 | 2.8 | 3.4 | 1.0 |
| | C | 5.0 | | 2.3 | 1.2 | 0.5 | 4.0 | 4.8 | | |
| 8 | A | 7.0 Betasan (B) | Rhoplex HA-8 | 11.2 | 5.1 | 1.9 | 4.2 | 0.8 | | |
| | B | 7.0 | | 5.2 | 6.1 | — | 4.9 | 2.0 | | |
| | C | 7.0 | | 2.9 | 1.2 | 1.0 | 2.9 | 2.7 | | |
| 9 | A | 10.0 Betasan (B) | Rhoplex HA-8 | 8.6 | 6.9 | 2.3 | 5.1 | 1.9 | | |
| | B | 10.0 | | 5.8 | 5.4 | — | 5.5 | 2.0 | | |
| | C | 10.0 | | 2.9 | 1.2 | 0.4 | 4.8 | 2.7 | | |

TABLE III – Continued

AMOUNT OF HERBICIDE (MG.) LEACHED OUT UPON DAILY WATERING
WITH THREE QUARTERS INCH OF SIMULATED RAINFALL

| Sample No. | Fab. | Herbicide and % Concentration | Binder | Day Number | | | | | | |
|---|---|---|---|---|---|---|---|---|---|---|
| | | | | 1 | 2 | 3 | 4 | 5 | 17 | 30 |
| 10 | A | 15.0 Betasan (B) | Rhoplex HA-8 | 11.1 | 7.0 | 1.0 | 5.0 | 0.7 | | |
| | B | 15.0 | | 5.2 | 6.7 | — | 5.0 | 2.4 | | |
| | C | 15.0 | | 2.6 | 1.2 | 1.5 | 3.8 | 5.7 | | |
| 11 | A | 7.0 Betasan (B) | PVAc | 10.1 | 7.6 | 3.0 | 4.1 | 0.9 | | |
| | B | 7.0 | | 4.1 | 5.9 | — | 5.4 | 1.4 | | |
| | C | 7.0 | | 3.4 | 1.4 | 0.4 | 4.2 | 3.1 | | |
| 12 | A | 15.0 Betasan (B) | PVAc | 11.4 | 10.2 | 3.2 | 4.7 | 0.5 | 3.8 | 0.7 |
| | B | 15.0 | | 7.1 | 7.7 | — | 5.8 | 3.1 | | |
| | C | 15.0 | | 1.8 | 1.6 | 0.7 | 3.6 | 3.0 | | |

[1] No data obtained for Fabric B on Day 3.

The following example is a further illustration of the invention, similar to those of the preceding examples which were subjected to simulated rainfall as above described.

EXAMPLE 13

A cotton fabric, a 60 × 48, grey print cloth, was padded with a binder formulation containing 7.1% polyacrylic acid ester (Rhoplex HA-8). This formulation also contained 7.1% of a pre-emergence herbicide (Planavin-75 by Shell). The padded samples were dried for 90 seconds at 250° F. and then heated for 90 seconds at 340° F.

A sample of this treated fabric and a sample of the same fabric treated with only 7.1% Rhoplex HA-8 were exposed several times to a measured amount of water simulating rainfall. Three portions of water, 300 ml each time (300 ml equals 0.75 inch rain for the test sample) were poured through the sample. Each 300 ml portion was collected, the water was evaporated and the residue was weighed. After 0.75 inch of rain, approximately 0.0028 grams of herbicide was released, the next 0.75 inch of rain released 0.0387 grams of herbicide and the final 0.75 inch of rain released 0.0165 grams of herbicide. So for a total of 2.25 inches of rain, a total of 0.0580 grams of herbicide was released from a 4.5 inch treated disk.

What is claimed is:

1. In a weed growth retardant product for woody plants individually growing in containers of soil, comprising:

a sheetlike water-permeable fabric substrate adapted to fit within a container on the surface of the soil therein about the stem of a plant therein, the improvement comprising having adherent to said substrate a very slightly water soluble film-forming binder containing a pre-emergence herbicidal agent, said binder being selected from the group consisting of vinyl based polymers, insolubilized carbohydrates, aminoplast resins, insolubilized proteins, polyesters, polyethers, polyamides, polyurethanes, and mixtures thereof, said herbicide being selected from the group consisting of S-(O, O-diisopropyl phosphorodithioate) of N-(2 mercaptoethyl) benzenesulfonamide,; 2,3-dichloroallyl, N,N-diisopropylthiolcarbamate; tributyl, 2,4-dichlorobenzylphosphonium chloride; 3-(3,4-dichlorophenyl)1-methoxy-1-methylurea; 2-chloro-4-ethylamino-6-isopropyl-amino-1,3,5-triazine; N-(3-chloro-4-methylphenyl)-2-methylpentanamide; 3-amino-2,5-dichlorobenzoic acid; 4,6-dinitro-o-secbutylphenol alkanolamine salts; 1-(2-methyl cyclohexyl)-3-phenyl urea; 3-(hexahydro-4, 7-methanoindan-5-yl)-1,1-dimethylurea; 4-methylsulfonyl-2,6-dinitro-N,N-dipropylaniline; α,α,α,-trifluoro-2,6-dinitro-N,N-dipropyl-p-toluidine, said herbicidal agent being released at a slow rate over a period of several months to prevent weed growth during plant development.

* * * * *